US008082345B2

(12) United States Patent
Ettle et al.

(10) Patent No.: US 8,082,345 B2
(45) Date of Patent: Dec. 20, 2011

(54) METHOD, SYSTEM AND APPARATUS FOR COMMUNICATIONS CIRCUIT DESIGN

(75) Inventors: David Roy Ettle, Bristol (GB); Nicholas Stuart Mackay East, Bath (GB)

(73) Assignee: Amdocs Systems Limited, Bath (GB)

(*) Notice: Subject to any disclaimer, the term of this patent is extended or adjusted under 35 U.S.C. 154(b) by 16 days.

(21) Appl. No.: 12/850,577

(22) Filed: Aug. 4, 2010

(65) Prior Publication Data
US 2011/0019586 A1  Jan. 27, 2011

Related U.S. Application Data

(62) Division of application No. 11/367,550, filed on Mar. 3, 2006, now Pat. No. 7,797,425.

(30) Foreign Application Priority Data

Dec. 22, 2005 (GB) .................................. 0526224.1

(51) Int. Cl.
*G06F 17/50* (2006.01)

(52) U.S. Cl. ......... 709/226; 709/238; 709/242; 370/216

(58) Field of Classification Search .................. 709/226, 709/242, 224, 238, 239, 249, 250; 370/216, 370/254, 351, 236, 238, 255, 400, 220
See application file for complete search history.

(56) References Cited

U.S. PATENT DOCUMENTS

| 7,500,013 B2 * | 3/2009 | Dziong et al. ................ 709/238 |
| 2002/0032760 A1 * | 3/2002 | Matthews et al. ............. 709/223 |

* cited by examiner

*Primary Examiner* — Wing Chan
*Assistant Examiner* — Ruolei Zong
(74) *Attorney, Agent, or Firm* — Zilka-Kotab, PC

(57) ABSTRACT

A method of designing a network circuit for a telecommunications network is disclosed. The method includes storing first model data in a database representing a first model of the telecommunications network. Second model data is received representing a second model of the telecommunications network. The second model data defines node groups, each representing a plurality of network nodes of the first network model, and interconnections between node groups, each representing connectivity between node groups in the first network model. The method involves searching the second model data to select a route from a start node group to an end node group, the route specifying a plurality of node groups connected by interconnections in the second network model; and searching the first model data to select a circuit from a node of the start node group to a node of the end node group.

7 Claims, 10 Drawing Sheets

METHOD, SYSTEM AND APPARATUS FOR COMMUNICATIONS CIRCUIT DESIGN

RELATED APPLICATIONS

This application is a divisional application of U.S. Non-Provisional application Ser. No. 11/367,550 filed on Mar. 3, 2006, which, in turn, claims benefit of priority under 35 U.S.C. §119 to GB Patent Application No. 0526224.1 by David Roy Ettle and Nicholas Stuart Mackay East entitled "Communications Circuit Design" filed on Dec. 22, 2005, the entire contents of both are hereby expressly incorporated by reference for all purposes.

TECHNICAL FIELD OF THE INVENTION

The present invention relates to methods and apparatus for designing circuits in telecommunications networks.

BACKGROUND OF THE INVENTION

Modern communications networks are highly complex and flexible, typically providing support for a variety of new and legacy circuit types. The complexity of equipment configurations, variety of vendor-specific feature sets and prevalence of domain-constrained management systems can provide real challenges to the circuit designer. Even where the design of telecommunications circuits is assisted by automated tools, the sheer size and complexity of networks often still lead to inefficient, cumbersome design processes requiring a high degree of human design input The present invention seeks to alleviate some of these problems.

SUMMARY OF THE INVENTION

Accordingly, in a first aspect of the invention, there is provided a method of selecting a route for a network circuit in a telecommunications network, comprising: storing, in a database, first model data representing a first model of the telecommunications network, the first model data defining network nodes and connections between network nodes in the telecommunications network; receiving second model data representing a second model of the telecommunications network, the second model data defining node groups, each representing a plurality of network nodes of the first network model, and interconnections between node groups, each representing connectivity between node groups in the first network model; searching the second model data to select a route from a start node group to an end node group, the route specifying a plurality of node groups connected by interconnections in the second network model; searching the first model data to select a circuit route from a node of the start node group to a node of the end node group, the circuit route comprising a plurality of nodes connected by connections in the first network model, the nodes of the circuit route being selected from the nodes of the node groups specified by the route.

In this way, a more efficient route search process can be provided. By using an abstract model of the network, in which nodes are grouped into node groups, to find an initial, abstract route, and then searching for a circuit route corresponding to the identified abstract route, the search space can be reduced. Equivalent or related nodes can be grouped into node groups based on given criteria, thus allowing the search to be guided in accordance with those criteria. Using the two-stage search approach can allow searches through complex networks that would otherwise be computationally expensive or even prohibitive.

The first model is thus a low-level, detailed model (also referred to herein as an inventory). The term "network node" or "node" preferably refers to a network entity through which a circuit may pass. This may be a physical or logical entity. For example, nodes may be pieces of equipment, devices, components for devices (e.g. cards), facilities of devices or subdivisions thereof (e.g. ports), or groups or associations of equipment or devices. Connections may be physical connections between nodes (for example cables), or logical connections (for example multiplexes, timeslots or other logical channels). A variety of approaches can be adopted in modelling the network, depending on how the network model is to be used.

The second model is an abstract, high-level model, which represents a less detailed view of the network by grouping individual nodes of the first, low-level network model, and representing each such group of nodes in the abstract model as an individual entity, referred to herein as a node group or topology. The abstract model also specifies interconnections between node groups, which represent connections between respective nodes of the node groups. Preferably, if any node in a first node group is connected to any node in the second node group in the low-level model, then the high-level model represents the node groups as being interconnected. Such an interconnection between node groups is also referred to as a topology connection. A single interconnection (or topology connection) is preferably specified in the abstract model regardless of how many connections there are between nodes of the node groups in the low-level model. Thus, an interconnection in the abstract model preferably specifies that a circuit can be constructed from nodes of one node group to nodes of another node group, but not the actual connections in the low-level model which would be used to form such a circuit.

The method preferably comprises constraining the search of the first model data in dependence on the selected route. This can allow the search space to be reduced, resulting in a more efficient search, preferably by searching only the portion of the first model data which defines the nodes and connections associated with the node groups and interconnections specified by the selected route. The selected route thus determines the portion of the detailed network model which is searched.

Each node group preferably represents a plurality of interconnected nodes of the first network model. Each node within a node group is preferably connected to each other node of the node group either directly or via one or more intermediate nodes within that node group. In this way, when a node is selected for inclusion in a route, it can be ensured that a corresponding circuit route is then available, since a circuit path is available between any two nodes in a given node.

Searching the second model data to select a route may comprise identifying a plurality of routes between the start node group and end node group; and selecting one of the plurality of identified routes. This can provide improved flexibility. The route is preferably selected in response to user input. This can allow the user to influence the search at the high level (rather than, say, having to pick from a large number of detailed and potentially similar circuit designs). The user's task can thus be simplified, and the search algorithm can be guided towards an acceptable solution, leading to improved efficiency, since the search does not need to explore the entire search space.

The method may comprise calculating a score for each of the plurality of identified routes, and preferably outputting the identified routes in accordance with the calculated scores. This can assist the user in selecting a route. Alternatively or in addition, the method may include selecting the route in dependence on the calculated scores, for example automatically. Calculating a score for a route may, for example, comprise determining the number of hops (or node groups) in a route or determining a measure of the diversity of the route from another route. In this way, the route selection may be improved. The scoring method may be user-specifiable. The method thus preferably comprises storing a plurality of scoring rules, receiving information specifying one of the plurality of scoring rules, and calculating the scores using the specified scoring rule. This can provide improved flexibility.

The method preferably further comprises processing the plurality of identified routes in accordance with a filtering rule. The filtering rule preferably excludes routes from the identified set of routes based on a filtering criterion, so that only routes which pass the filtering rule are further considered and/or presented to the user for selection. This can allow greater control over the search, and again help to guide the search and reduce the search space in the subsequent detailed search. For flexibility, the filtering rule is preferably user-specifiable, for example by selection from a plurality of stored filtering rules as described above in relation to scoring rules. Multiple filtering and/or scoring rules may preferably be specified and are applied in combination.

Selecting a circuit route preferably comprises selecting, in a first stage, a sequence of nodes corresponding to the node groups of the selected route, and, in a second stage, selecting a sequence of network connections connecting the nodes in the identified sequence of nodes to form the circuit route. This can simplify the search and reduce the search space, since only relevant connections have to be considered once nodes have been selected based on some criteria (which may again include user-specified criteria).

Searching the first model data to select a circuit route may comprise identifying a plurality of circuit routes and selecting one of the plurality of circuit routes, preferably in accordance with a score calculated for each circuit route or in response to user input. The scoring and selection of circuit routes preferably corresponds to the scoring and selection of routes described above. Thus, the features described herein in relation to scoring, filtering and selection of routes may also be applied to circuit routes (and vice versa).

The method preferably comprises receiving a routing request including routing information, and selecting the start node group and end node group in dependence on the routing information. The request may, for example, specify start and end locations associated with the start and end node groups (for example, equipment sites), the start and end node groups themselves, or specific start and end nodes within those groups (or a combination of the above).

The method may comprise generating the second model data and storing the second model data before receipt of the routing request. Thus, the second model can be produced off-line and is available to subsequent searches. This can be more efficient. Alternatively, for improved accuracy, the method may comprise generating the second model data in response to the routing request, i.e. 'on-the-fly'. In either case, the method may comprise storing the second model data in a database, the receiving step comprising retrieving the second model data from the database.

Preferably, the method comprises generating the second model data in dependence on the first model data, preferably by deriving the second model data at least partially and preferably entirely from the first model data. In this way, the second model can be produced automatically, which can lead to greater efficiency, accuracy and reliability. The method may comprise assigning nodes to node groups in dependence on one or more predetermined criteria or rules. These may be user-specifiable, user-selectable and/or user-configurable.

Searching the first model data may comprise:
receiving a routing request specifying a routing rule; identifying a first node; selecting one or more nodes connected to the first node in dependence on the specified routing rule; and continuing the search from the or each selected node. By selecting nodes in accordance with a routing rule during the search, the search space can be pruned, which can improve efficiency by ensuring that certain nodes or types of nodes are not considered for inclusion in a route.

Continuing the search preferably comprises repeating the selecting and continuing steps for each selected node, preferably until a predetermined termination condition is reached, which may comprise one or more of: a predetermined number of circuit routes being identified, a predetermined time period having elapsed and a predetermined circuit route length being reached (for example in terms of the number of hops/nodes in the circuit routes). Operational or computational resource criteria may alternatively or additionally be used as termination criteria. The same method of pruning the search space may also be applied to the search of the second model data, by applying a filtering rule to node groups during the search and/or using a termination condition as described above.

The method may comprise modifying the first model data in the database in dependence on the selected circuit route. Thus, once a circuit has been identified/selected, the detailed model can be updated to reflect the new circuit. This ensures the model maintains a correct view of the network. The method preferably includes implementing a circuit using the selected circuit route in the network in dependence on the modification made to the first model data in the database. In this way, changes to the actual network follow changes in the model, which can improve accuracy of the model.

In a further aspect of the invention, there is provided a method of selecting a route for a telecommunications circuit, comprising: storing a database comprising a model of a telecommunications network; storing a plurality of routing rules; receiving a routing request specifying a route start point, a route end point and one or more of the stored routing rules; and selecting a route between the specified route start point and end point in the network model in dependence on the specified routing rule or rules. In this way, greater flexibility can be provided. The start and end points may be nodes, node groups, network locations or sites, or any other suitable designations on the basis of which a route can be identified.

The method preferably comprises storing a plurality of routing profiles, each routing profile specifying one or more routing rules, and the routing request preferably specifies a routing rule or rules by specifying a routing profile, the route being selected in dependence on the routing rules specified by the routing profile. This can provide an efficient way of configuring the search.

For improved flexibility, the routing rule or profile may be associated with a parameter, the method comprising requesting information corresponding to the parameter from a user.

For efficiency, a routing rule may specify a condition on an attribute value of a network object represented in the network model. Alternatively or in addition, a rule may comprise executable program instructions (for example in the form of a script or stored procedure), the rule being evaluated by executing the instructions. This can provide greater flexibility and can allow more complex rules to be specified.

The method may comprise identifying a plurality of routes between the start point and the end point, and selecting one or more of the identified routes in dependence on the specified routing rule or rules. Thus, rules may include route filtering rules for excluding routes (or circuit routes) from consideration.

The network model preferably defines network nodes of the telecommunications network and connections between the network nodes, and selecting a route preferably comprises searching the network model by a process including: identifying a first node in the network model; selecting one or more of a plurality of nodes connected to the first node in the network model in dependence on a specified routing rule; and continuing the search using the selected node or nodes. The specified routing rule may be a node filtering rule as already described above. Various features of the search process and route selection have been set out above in relation to the first aspect of the invention, and may be incorporated into this aspect.

In a further aspect of the invention, there is provided a method of identifying a route for a network circuit using a network model defining network nodes and connections between network nodes, the method comprising: identifying a first node in the network model; selecting one or more of a plurality of nodes connected to the first node in the network model in dependence on a node filtering rule; and continuing the search using the selected node or nodes. As already mentioned, the search space can thereby be reduced, resulting in a more efficient search.

The model is preferably stored in a database comprising database entities representative of network nodes, the selecting step comprising: receiving a database query for selecting network nodes connected to the first node; modifying the database query in accordance with the node filtering rule; and issuing the database query.

In this way, selection of nodes can be more efficient, since the database query will only search for and return nodes which match the filtering rule, instead of initially returning all connected nodes from which a further selection would then have to be made. The database may define connections between nodes in the model as relationships between database entities representing nodes or as cross-references between such entities, or may store database entities representing the connections.

The database query is preferably expressed in a database query language, and the node filtering rule comprises a condition expressed using the database query language; in which case modifying the database query preferably comprises incorporating the condition into the database query (optionally after pre-processing). In this way, the query can be constructed efficiently. For example, where queries and query conditions are expressed in text form, the query can be constructed using simple text operations. The query language may be SQL. The node filtering rule may specify a condition on an attribute value of database entities representing network nodes in the network model.

In a further aspect of the invention, there is provided a method of selecting a route for a telecommunications circuit comprising: storing a database comprising data representative of a network model, the data comprising: data representative of network nodes of the network; data representative of existing connections between nodes; and data representative of potential connections between nodes, the data specifying nodes which may be connected in the network but which are currently not connected; the method further comprising searching the data representative of existing connections and the data representative of potential connections in the network model to determine a route through the network from a start node to an end node. In this way, a more flexible route search can be provided.

The determined route may comprise a plurality of connections of which at least one is a potential connection. The method preferably comprises generating implementation information for implementing a circuit in the network using the determined route. Where the determined route includes a potential connection between nodes, the method preferably comprises outputting information indicating a requirement to provide an actual connection in place of the potential connection, and/or connecting the nodes in the network.

In a further aspect, the invention provides a method of designing a network circuit using a network model defining network nodes and connections between network nodes, the method comprising: accessing a simplified representation of the network comprising node groups each representing a group of nodes in the network model, and interconnections between node groups each representing connectivity between the node groups; searching the network representation to identify a route from a start node group to an end node group; and searching the network model to identify a circuit corresponding to the identified route.

In a yet further aspect, the invention provides a method of selecting a route for a telecommunications circuit comprising: accessing a network model, the network model specifying network nodes, existing connections between network nodes, and potential connections between network nodes; and searching the existing connections and potential connections in the network model to determine a route through the network from a start node to an end node. The term "potential connection" preferably refers to a connection which can be made in the network but is currently not in place. Thus, the network model may specify a potential connection between two nodes (which may represent devices). The nodes or devices are then not actually connected in the network, but have been designated in the model (typically by a network designer or modeller) as being connectable, for example, by creating a physical connection between them using a cable. The determined route may include one or more such potential connections. Implementing the designed circuit would then typically involve installing actual connections in place of the potential connections.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale. Preferred features of the present invention will now be described, purely by way of example, with reference to the accompanying drawings, in which.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure. Reference is now made in detail to the exemplary embodiments of the invention, examples of which are illustrated in the accompanying drawings. Wherever possible, the same reference numbers will be used throughout the drawings to refer to the same or like parts (elements).

Figure 1:
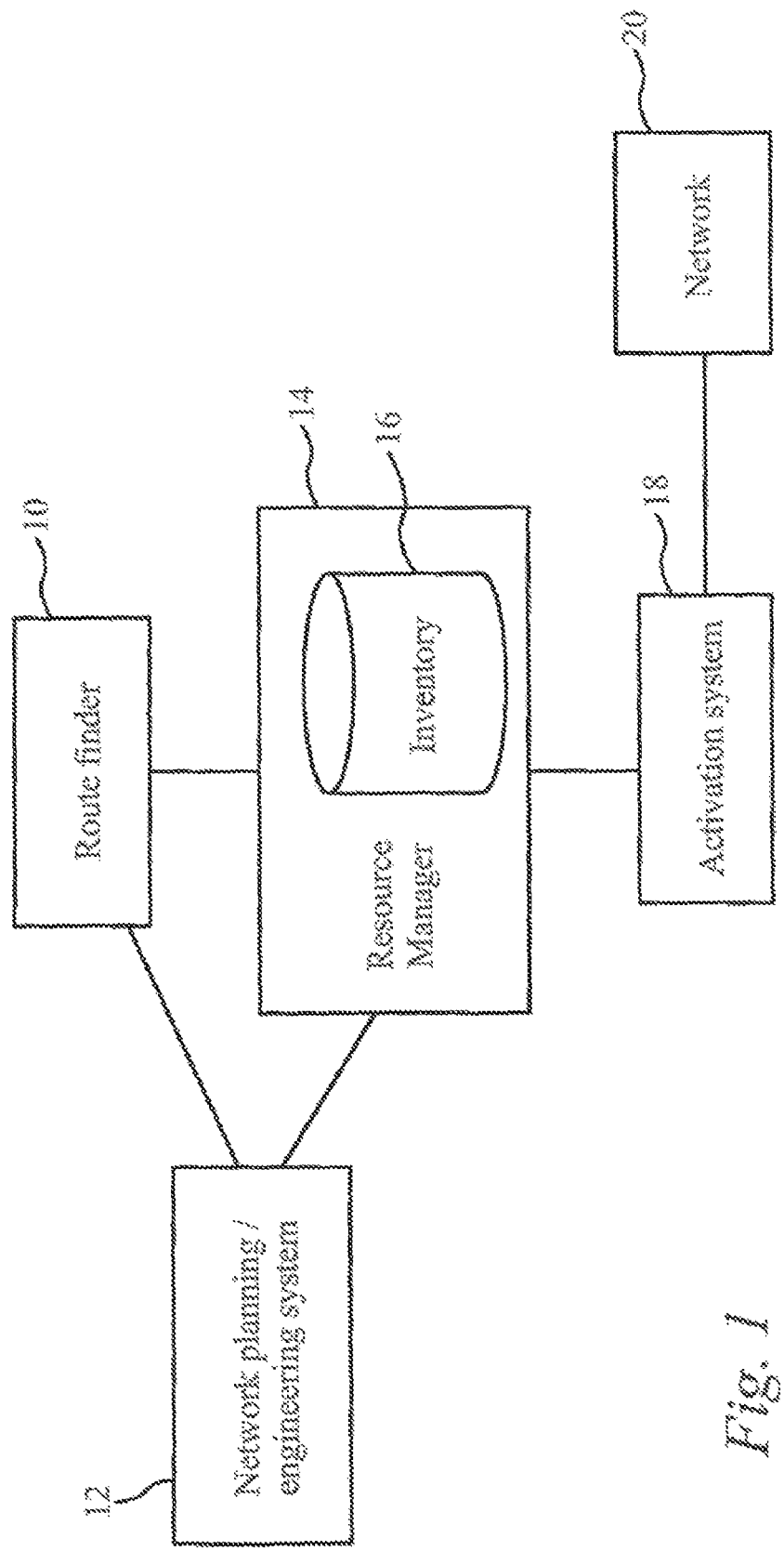
FIG. 1 illustrates a telecommunications system including a route finder application.

FIG. 1 illustrates a telecommunications system in overview. The telecommunications system comprises a network 20 used to provide telecommunications services to end-users. A resource manager 14 manages network resources available in network 20. Specifically, resource manager 14 maintains an inventory 16 of the network resources and controls changes and additions of resources. The inventory 16 comprises a model of the network and is stored in a database.

A network planning/engineering system 12 interacts with the resource manager 14 to provide new resources and services, either in response to specific user requirements or based on strategic planning.

Provisioning of network services often involves the design of telecommunications circuits connecting specific network locations, and the identification, reservation and configuration of network resources needed to form the circuits. For example, to provide a telecommunications circuit between two specified locations, it may be necessary to find a sequence of individual circuit paths which together form a route between the required end points, and reserve bandwidth on each of those paths to ensure the resulting circuit meets overall bandwidth requirements. A route finder application 10 is provided to assist the user in designing such circuits. The route finder application 10 uses the inventory 16 to identify possible circuit routes through the network model and to implement a selected circuit in the inventory. The resulting circuits may use one or more different networking technologies, including structured bandwidth technologies such as SDH, SONET, PDH, DWDM, and packet data domains such as Gigabit Ethernet, IP, MPLS and RPR.

Changes made to the inventory 16 during the creation of new circuits in the network are implemented in the network 20 by way of an activation system 18 which performs the necessary device configurations.

Route Finder Overview: The route finder application provides an at least partially automated mechanism for finding routes for new telecommunications circuits within a network modelled in the inventory 16. The modelled network may include multiple network domains managed by the same or different network management systems. The inventory may model both existing and planned network resources, and the routing process may make use of both in designing circuits.

The route finding application can search for routes between specified locations, devices, or specific entities contained within locations or devices.

The route finding process searches the inventory 16 in a breadth-first fashion starting at a specified start location or device and looking for a route that ends at a specified end location or device. A valid route must usually use contiguous underlying circuits of appropriate type according to the type of circuit being created.

The user can set search constraints (for example, the number of solutions to return, the maximum number of hops allowed, status constraints on network equipment used in the route, or computational constraints on the search such as processing time). The specified constraints are then applied during the search. For example, if a search requires free bandwidth for the exclusive use of the new path, the route finder application will only suggest routes on which this bandwidth is available. If a search requires bandwidth overbooking constraints to be enforced (for example, in packet networks), only solutions that satisfy these constraints will be returned.

The route finder application may be used to design circuits for any appropriate networking technologies, and may operate at different levels of a networking hierarchy. For example, in SDH or SONET networks, the route finding process preferably allows the creation of high order (such as VC4 and OC-3c) and low order (such as VC12 and DS1) paths and trails, with or without protection.

In a preferred embodiment, the route finder application 10 is primarily invoked by a user from within the network planning/engineering system 12. User interface features of the route finder application 10 are described below.

Search Algorithm: The search algorithm used by the route finder will now be described with reference to FIGS. 2 to 7.

Figure 2:
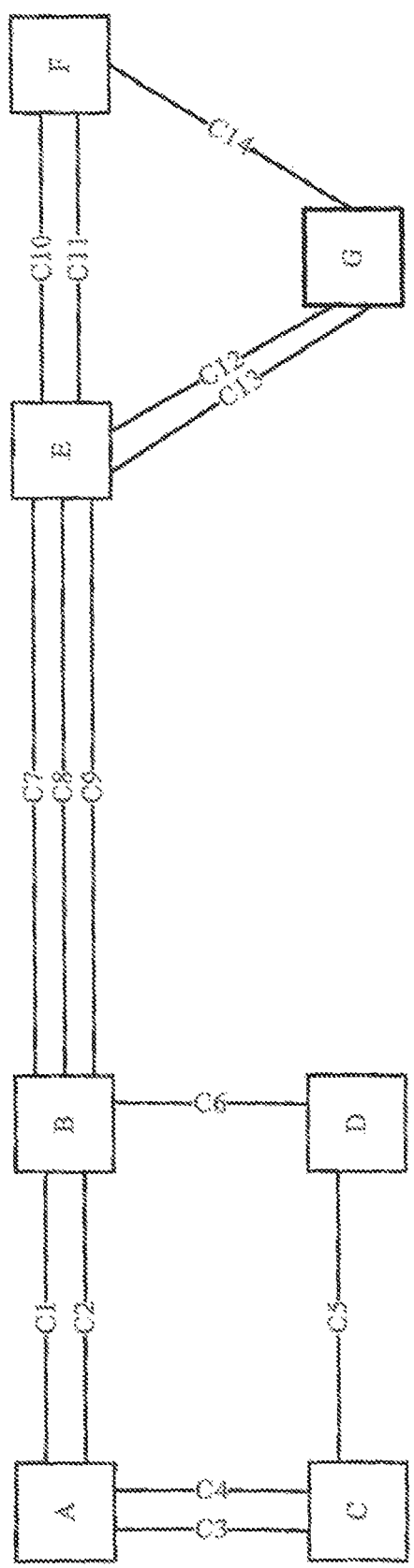
FIG. 2 shows a simple example of a network model.

FIG. 2 shows a simplified representation of a network model (as may be stored in inventory 16). The network model comprises network nodes connected by circuits; the example network shown includes seven network nodes (A-G) connected by fourteen circuits (C1-14). The term "network node" as used herein preferably refers to any network unit or component which can form a route point in a circuit route, and through which network communications can pass. Typically, network nodes represent either active or passive networking devices or pieces of networking equipment. Circuits may represent physical connections (wired or wireless) between pieces of network equipment, but may also represent logical channels carried on physical connections.

A user may, for example, request a circuit between network locations A and G. In the network shown, circuits C1, C7 and C10 provide a contiguous route between locations A and F, while circuits C1 and C10 alone do not.

Figure 3:
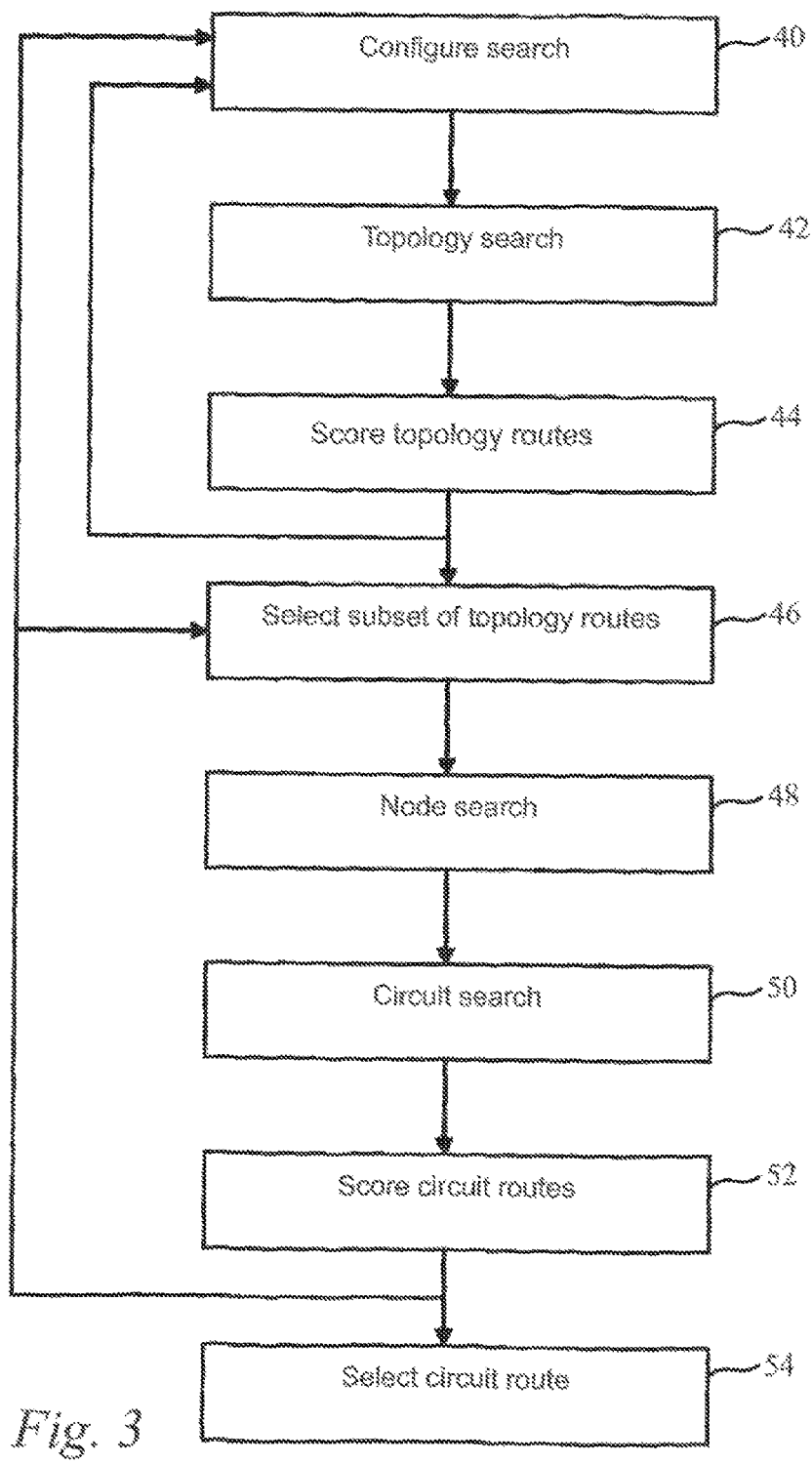
FIG. 3 illustrates a search process used to search for circuit routes in a network model.

The search process is illustrated in overview in FIG. 3.

In step 40, the user configures the search by specifying search parameters and constraints. Specifically, the user typically provides the following information:
Start and end points, for example, locations, devices or specific ports.
Circuit type and required bandwidth, for example SONET DS3, SDH VC12, PDH E3, GigE flow at 600 Mbps.
A routing profile, which encapsulates the operational and technical constraints placed on the search—profiles are discussed in more detail below.
Other relevant parameters may also be specified.

In step 42, an initial set of simplified routes (referred to here as topology routes) is identified. This stage of the search is referred to as the topology search. Topology routes are abstract routes through a simplified model of the network. The identified topology routes are then scored in step 44, and presented to the user ranked according to score. In step 46, the user selects one or more of the identified topology routes to form the basis of the next stage in the search.

Next, in step 48, logical node routes are identified, which specify routes in more detail in terms of the sequence of network nodes through which a route passes. This stage of the search is referred to as the node search. Using the identified node routes, detailed circuit routes are identified in step 50, referred to as the circuit search. Circuit routes specify the network connections between the nodes specified by the node routes. The circuit routes are scored in step 52 and again presented to the user ranked according to score. In step 54, the user then selects one of the identified circuit routes for use in implementing the circuit.

If the topology search 42 returns no results or none of the identified topology routes meet the user's requirements, the user may return to the search configuration step 40 to modify the search parameters and attempt a new search. If the circuit search 50 fails to find any circuit routes, or none of the identified circuit routes meet the user's requirements, the user may similarly return to the configuration step 40, or may alternatively return to the topology route selection step 46 to specify a different set of topology routes as input to the node search/circuit search stages.

The search stages will now be described in more detail.

Topology Search: The topology search is based upon an abstract model of the network in which groups of equivalent network nodes in the underlying network model are represented as vertices in a simplified network graph (with a given vertex representing a node group), and the connectivity between these groups is represented by edges in the graph. This abstract model may be stored as part of the inventory 16, or may be stored separately.

Network nodes may be considered as being "equivalent" based on a number of factors, such as for example geographical location (for example, network nodes could form a group if located in the same building, or city). The specific grouping of network nodes will typically depend on the operator's routing requirements, and will be defined by the network designer when modelling the network. However, in alternative embodiments, the abstract model may be generated automatically (either at some point prior to the search or on the fly at the time of the search) based on a set of rules which determine how nodes and circuits should be grouped.

Node groups are also referred to as topologies. In typical examples, topologies represent subnetworks, with the topology search identifying subnetwork-to-subnetwork routes without regard to the network detail within the subnetworks. Examples of topologies may include geographic regions, collections of network elements selected based on technology or device vendor (e.g. subnetworks formed from devices of the same or related technology or having the same device vendor), SDH rings, linear chains and meshes. Generally speaking, a topology may represent a spatial, location-based or geographic grouping of network elements, or a logical grouping based on attributes of the network elements, or any other suitable grouping.

Figure 4A:
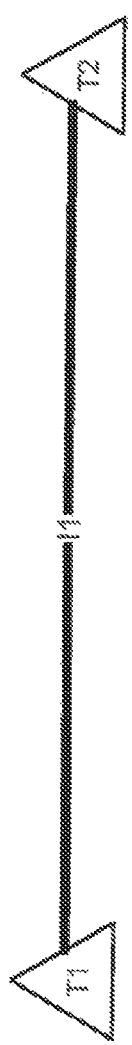
FIGS. 4A, 4B and 4C illustrate solutions identified by several stages of the search process

As an example, the network of FIG. 2 could be given the abstract representation shown in FIG. 4A, where topology T1 represents network nodes A to D and topology T2 represents network nodes E to G. Interconnect I1 represents circuits C7 to C9. Circuits internal to the topologies are not represented in this simplified model. This example illustrates how the abstract model can be much simpler than the actual underlying network.

Searching within the abstract model can provide a significant performance improvement over searching the more detailed network model, since the search space is reduced. Also, circuit designers may often find it more convenient to work with this higher-level, abstract representation of the network, at least in the initial stages of the design process. For example, in the SONET, SDH and RPR domains, it can be easier to design and visualize a path through the network in terms of the rings that the network traverses, rather than a list of equipment through which the path passes.

After completion of the topology search, the set of routes found at this abstract level is presented to the user. Preferably, only those topology routes with the ability to support the chosen circuit bandwidth are chosen as results. To achieve this, the original result set may be limited by searching the identified topology routes for available capacity over which to create the new circuit.

Alternatively, all topology routes may be chosen as results. In that case, the output may specify when identified routes do not have the capacity to support the circuit, to enable the user to identify routes where capacity has been exhausted. In another example, if the user is interested specifically in capacity problems, the search could be configured to output only routes which do not have the capacity to support a chosen circuit bandwidth.

Figure 4B:
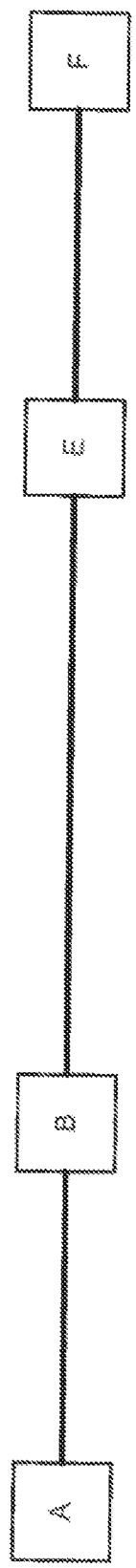

Node Search: The node search searches for a route through specific nodes within the topologies identified in the topology search. This search thus uses the more detailed representation of the network stored in the inventory 16. However, the network model is simplified during the node search by considering all circuits between a given pair of network nodes to be equivalent (for example, circuits C1 and C2 in FIG. 2). Returning to the previous example, where a user is searching for a route between nodes A and F in the network of FIG. 2, an example solution found by the node search is illustrated in FIG. 4B. The node route found specifies that the circuit route will pass through network locations B and E but not what circuits should be used.

In preferred embodiments, node routes found by the node search are used as input to the circuit search stage without being presented to the user. However, alternatively, the user could be given the option of reviewing and selecting one or more node routes for input to the circuit search.

Though shown as separate search stages, the node and circuit searches may also be combined into a single stage.

Figure 4C:
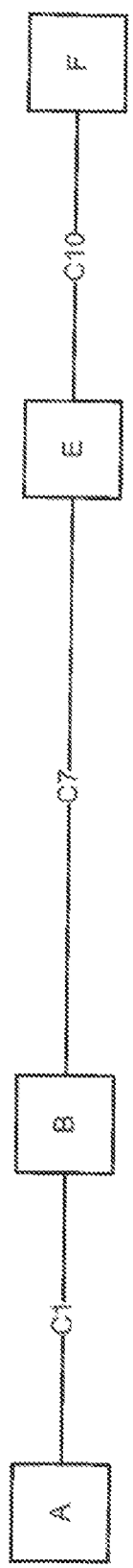

Circuit Search: The circuit search stage finds specific circuits between each pair of network nodes in the note routes identified by the node search, resulting in one or more circuit routes. Continuing the previous example, an example of a circuit route is illustrated in FIG. 4C, where specific circuits C1, C7 and C10 have been selected to connect the previously identified nodes.

At the end of the search, the circuit routes found by the circuit search are presented to the user. For clarity, a route is typically presented in text form as a list of node names without the connecting circuits being specified. Alternatively, a route may be presented as a list of nodes and connecting circuits. The presentation may be customizable.

Whenever alternative solutions are presented to the user for selection, these are ranked according to a scoring rule (typically with the highest-ranked solution present first in an ordered list). As an example, topology routes or circuit routes may be ranked according to the number of hops in the routes (a hop being a single step from one node or topology to a connected node or topology). Preferably, the user may select a predefined scoring rule or provide a user-defined scoring rule. Scoring rules are discussed in more detail below.

Where the user selects multiple routes from the topology routes identified by the topology search, the node search and circuit search stages search for node routes and circuit routes corresponding to each of the selected topology routes.

Instead of the manual selection of one or more topology routes by the user after the topology search, in some embodiments selection rules or criteria may be defined using which the search can be completely automated. This may, for example, be based on the scores calculated for the identified topology routes in scoring step 44. For example, the highest scoring topology route may be selected, and the node and circuit search stages then proceed to identify circuits corresponding to that topology route.

After completion of the circuit search, the user may then select one of the circuit routes found for implementation of the circuit in the inventory 16. Alternatively, if the circuit routes found are considered unsuitable (or no circuits matching the search criteria can be found), the user may return to the results of the topology search and select a different topology route or set of topology routes from which to generate new circuit routes. As a further alternative, the user may change the search parameters and repeat the entire search.

Referring back to FIG. 1, once a circuit route has been selected, the route finding process 10 then interacts with the resource manager 14 to create the identified circuit and reserve the required bandwidth in the inventory 16. The changes made to the inventory are recorded in the form of change records, which are then used by the activation system 18 to implement the circuit in the network 20. The implementation of the circuit may include generation of configuration instructions for network devices or network management systems as well as information regarding manual configuration steps that may be required.

In some cases, it may be necessary to provide configuration parameters for elements of the identified circuit to enable implementation of the circuit (such as port terminations and timeslot mappings). Preferably, the route finding process provides default assignments for any such parameters, but may allow the user to override such defaults with specific assignments.

Route Search Algorithm: At any of the different stages of the search, a breadth-first search through the abstract or detailed network model is used to identify possible routes. For clarity, the process will be described in terms of a search through nodes and connections between nodes. It will be understood that the algorithm can be applied both to the node/circuit search and to the topology search, in the latter case by substituting the term "node" by "topology" or "node group" in the following description.

Specifically, the search algorithm searches outwards from the start node to any connected neighbouring nodes. In the detailed network model, neighbouring nodes are typically those which are connected to the start node by way of a circuit connection specified in the network model, but may also include nodes reachable via an 'air gap' (i.e. a potential connection) as is discussed in more detail below.

The available neighbouring nodes are filtered in accordance with one or more filtering rules which remove invalid nodes from the search and thus serve to reduce the search space and range of possible solutions. This can improve the efficiency of the search algorithm. Filtering rules are discussed in more detail below.

The above steps are then repeated, starting from each of the neighbouring nodes that remain after filtering, until the end node is reached, thus forming a completed route. The algorithm may then continue the search to find further routes. The algorithm can thus search for multiple routes in parallel (a sequential search algorithm could alternatively be provided).

Termination of the search is preferably governed by a termination condition specified by the user. For example, the termination condition may be a maximum number of solutions to be returned. The search will then terminate once the specified number of solutions have been found. Alternative termination criteria could include a maximum route length (e.g. in terms of a maximum number of nodes or 'hops' in the routes), in which case the search would then terminate once the search has reached the predetermined route length; or operational/computational criteria such as a processing time limit (e.g. CPU or actual time), a memory usage limit during the search (e.g. for RAM, virtual memory or disk usage), or a limit on the amount of data generated. Multiple termination criteria may be combined.

The process preferably outputs a message indicating the reason for the termination of the search—for example specifying that the required number of solutions have been found, or that no further solutions can be found in the network (in which case the search may return fewer than the specified number of routes).

Protection: In a preferred embodiment, the route finder can be used to find pairs of routes between two given end points which satisfy some predetermined constraint or constraints. This capability can be useful when the route of one circuit being designed needs to be influenced by the route of another, as is the case when searching for a protected pair of circuits. In a protected pair of circuits, one of the circuits provides protection for the traffic carried by the other, should the other circuit fail. Typically, the shorter of two routes is selected as the main route, the longer route being used as the protection route.

The specific constraints placed on pairs of routes may depend on requirements. A common example is a physical diversity constraint, where the fact that the first circuit uses a particular piece of networking equipment precludes the second circuit from also using it (so that failure of a given piece of equipment can only affect one of the two circuits of the protected pair). However, instead of physical diversity (which typically operates at the equipment/device layer), higher-level diversity constraints could also be used (for example at the topology layer).

When working in protection mode, each solution output by the route finder application comprises a pair of circuit routes. The user can then select the pair to create within the inventory 16.

The desired relationship between routes in a pair is preferably user-specifiable by way of rules. Alternatively or additionally, predefine rules may be provided by the system. Rules are discussed in more detail below.

In a specific example, to find physically diverse circuits, the route finding process preferably provides a physical diversity rule. This rule checks for diversity against the physical network underling the network across which the route search is taking place.

Figure 5:
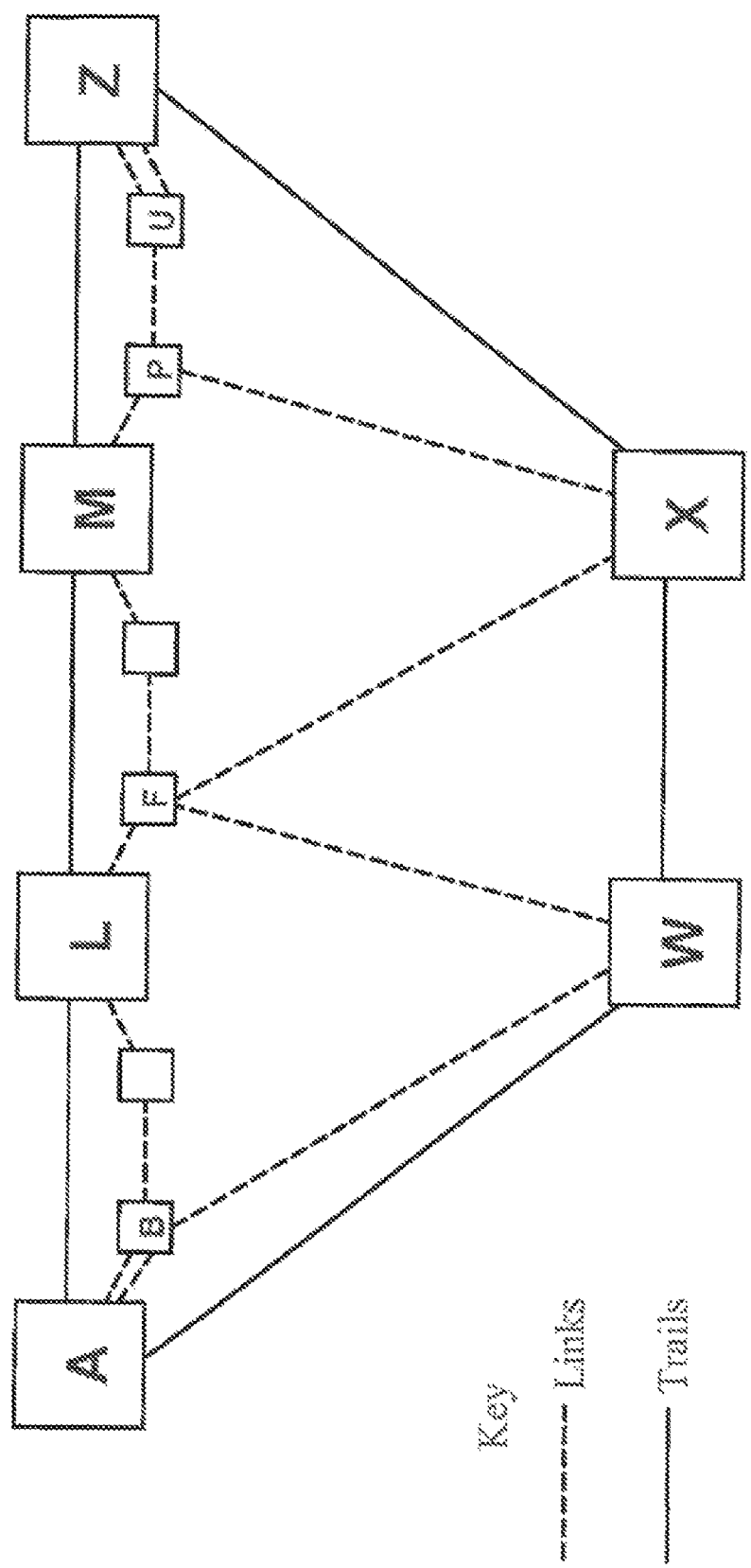
FIG. 5 illustrates a process of searching for diverse circuits.

FIG. 5 illustrates a simple network against which a user has requested diverse routes between network locations A and Z. The circuit type whose route is being sought is carried upon circuits of type 'Trail' (solid line), and these circuits are in turn carried on circuits of type 'Link' (dotted line).

In this example network only two routes are possible, a first route comprising A, L, M and Z, and a second route comprising A, W, X and Z. At the trail level these are diverse, the same start and end equipment being unavoidable. The physical diversity rule looks at the link level and at this level equipment B, F, P and U are shared. These two routes would therefore fail to meet the physical diversity rule.

Where routes are scored according to a cost criterion, the combined cost of the routes in a pair is preferably used to score route pairs.

In the above examples, the route finding process searches for pairs of diverse circuits, where both circuits are to be newly implemented. Alternatively, the process may search for a single circuit which is diverse from an existing circuit. This may, for example, be the case where a user requests an additional service, and operational rules specify that the circuit for the new service should be physically diverse from a circuit associated with an existing service provided to that user.

In addition to the selection of protection circuits, the protection requirements may also affect the configuration of circuit characteristics, such as timeslot mappings. The route finding process thus preferably allows the user to select one of a number of predefined protection behaviours, and the default configuration of the circuits found in the search is then varied based on the selected behaviour. By way of example, in preferred embodiments, the process provides two types of protection behaviour: SNCP protection and path protection. IN SNCP protection, if the protected circuit route and the protection circuit route share any common circuits then they are allocated the same timeslots of the common circuits, in shared mode. In path protection, they are allocated different timeslots of the common circuits, in exclusive mode.

Air Gaps: In a given telecommunications network it may be possible to identify pairs of pieces of equipment (or network nodes) between which connectivity is possible but not actually in place (such locations are sometimes referred to as points of flexibility since they allow for the creation of new connections). These gaps in the network are referred to here as "air gaps". For example, a number of topological rings providing high bandwidth services may converge in an equipment building, but, to provide greater flexibility, the physical interconnection between the converging rings may not be predefined, and is instead created as required for a new service. In the network this may involve implementing the physical connectivity between multiple digital or optical distribution frame devices.

In preferred embodiments, the route finding process allows the search for a route to proceed across the air gap as if connectivity was actually in place.

Figure 6:
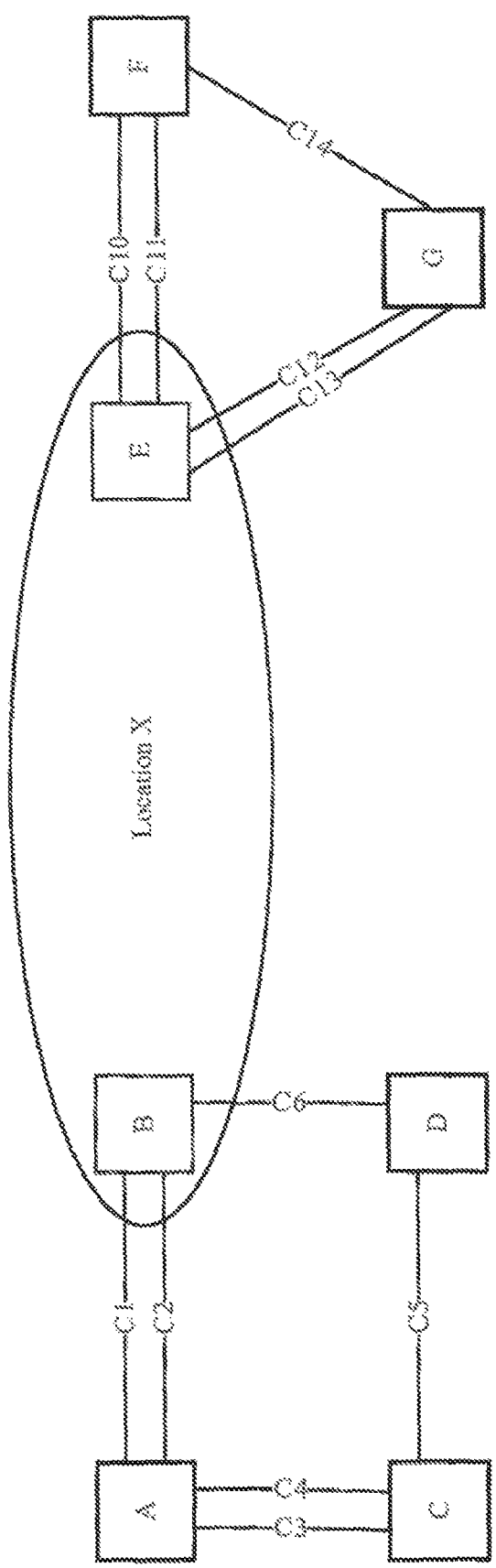
FIG. 6 illustrates a network with an air gap.

An example of this is illustrated in FIG. 6, in which network nodes B and E are in the same location (e.g. the same building) but are not currently connected by any circuits.

In the example, the route finding process would then still find a route between A and F but would indicate that a new circuit would need to be created between B and E to bridge the air gap.

The presence of air gaps may be derived from the information in the inventory based on predefined rules (for example using information in the inventory describing the physical location of network nodes and the types of equipment). Alternatively, the presence of air gaps between particular network nodes may be specifically recorded in the inventory 16 (typically by the network designer) in places where this behaviour is desired. This reflects the fact that air gaps are typically designed, not accidental. A combination of rule-based and inventory-defined air gaps may also be used.

Where a rule-based approach is used, the rules used to identify air gaps are preferably configurable to take into account the differences between operators in their approach to managing their networks. Air gap routing may be automatic or may be a user-selectable option.

On creation of the end-to-end route, the route finder application preferably generates instructions for the network change required to support the new route.

Port Reservation: In preferred embodiments, the route finding process is also able to find and allocate outward facing ports into which a user would need to connect to take advantage of the circuit route that has been identified and created by the route finder.

Figure 7:
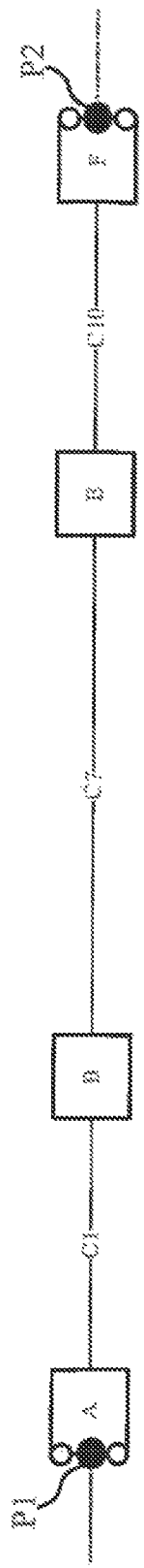
FIG. 7 illustrates the assignment of ports for a designed circuit.

FIG. 7 illustrates an example of a circuit created by the route finding process between nodes A and F (in the network of FIG. 2), in which the route finding process has reserved one port P1 on node A and another port P2 on node F into which a user must connect. Once the circuit has been implemented in the network any data sent into port P1 at node A will arrive at the assigned port P2 on node F.

Other Start and End Objects: In preferred embodiments, the route finder application by default allows the user to pick a start and end node or start and end topology (node group) between which a route is to be found.

Alternatively, the user May select a start and/or end location. In that case, the route finder application considers all equipment within the start and end locations to be valid starting and ending points for its search.

This can be particularly useful if the user knows they need to provide connectivity between two locations but it is not important which equipment within the locations is used to terminate the new circuit.

The route finder application can also be configured to allow other objects to be selected as the start or end point of the search. For example, the start point could be a telecommunications service subscriber and the route finding process would then search from any location at which the subscriber already has a service.

Filtering and Scoring Rules: The search process can be configured with user-specified rules. These rules allow the search to be customized to take into account user requirements.

Typically these rules reflect requirements placed on circuits of a given type (such as the physical diversity rule discussed above). Rules may also be used to embody decisions that an operator took when designing their network.

In preferred embodiments, the route finder application is pre-configured with a variety of rules, including, for example, rules that ensure the underlying network has sufficient capacity. Advanced rules can also be provided (such as the physical diversity rule).

Two main types of rules are provided: filtering and scoring rules. Filtering rules serve to constrain the search space during the route search by eliminating solutions that do not satisfy specific requirements. Scoring rules allow routes, once found, to be ordered by preference, for example in order of the minimum number of hops (nodes) in the route, or by the degree of diversity of route pairs.

Filtering rules can be evaluated either during the course of the search (i.e. between search steps), after a candidate route has been found, or at the end of the search once all candidate routes have been found. Rules that act during the search can serve to prune the search space and can hence improve the efficiency of the search. However, for some rules, evaluation may only be possible after a route (or pair of routes) has been identified, such as some examples of the physical diversity rule discussed above. Such a rule would be used to test whether an identified pair of routes fulfills the diversity criteria once the routes have been identified. Alternatively, a diversity rule could be used which operates to exclude common nodes during the search. Specifically, this rule would exclude a node from consideration during the search if the node already appeared in another identified route.

Rules may be defined in relation to any of the three stages of the search. An example of a rule at the topology search stage could be to avoid a given node group (perhaps because it is reserved for use by a particular user or for a particular circuit or traffic type). At the node search stage, a rule could be provided which disallows planned equipment (where planned equipment is modelled in the inventory 16). Planned equipment would then not be considered during the search, leading to a reduction in the search space and hence a more efficient search.

Rules can make use of any information stored in the inventory. For example, rules may be specifiable as constraints on attributes of topologies, nodes or circuits (e.g. as metadata), or, for more complex rules, as code plug-ins which can be invoked by the route finder application.

Rules may specify user-defined search parameters, for values which are to be entered by the user at the time of the search. These parameters may be either simple attributes or inventory objects. For example, a rule may require a list of nodes which the route must not pass through. The route finder application then prompts the user for the required information at the start of the search.

Simple filtering rules may be defined as conditions on attributes of inventory objects, whilst more complex filtering rules may be specified as code or scripts.

In a preferred embodiment, the inventory is stored as a relational database, and the search process obtains the available neighbouring nodes for a given node using an SQL query. Simple rules are expressed as conditions in SQL syntax (referring to the relevant tables and fields in the inventory database). These SQL fragments are then integrated into the query statement used to obtain the set of neighbouring nodes. In this way, filtering rules can be applied efficiently. In this embodiment, more complex rules may be implemented as stored PL/SQL procedures. In other database systems, the same approach can be used, but using different query and programming languages.

Scoring rules are used, to score solutions (routes or pairs of routes). Identified solutions are then listed in the order as given by the scoring rules. A sequence of scoring rules can be specified, in which case the result list is ordered first by the first-specified scoring rule, and, within a given score level, by subsequently specified scoring rules.

Profiles: Search profiles can be used to simplify the search configuration. A profile can comprise:

configuration information for the search, for example the termination condition (e.g. a maximum number of results to be returned), whether air-gap routing should be enabled, and the circuit type (e.g. data trail, data path, TDM/Data trail, TDM trail, TDM path).

restrictions on the search, such as specific network nodes which are to be used filter rules and scoring rules Like rules, profiles may include parameters to be specified by the user at the time of the search. For example, a search profile may be defined which requires the user to identify a hub location to be used in the search. At the time of the search, the route finding process will then ask the user to provide the necessary information.

Profiles preferably do not include the definition of rules but instead include references to externally stored rules. This can allow the same rule to be associated with multiple profiles, and changes to a rule can be implemented easily without changing every profile using the rule. Also, the same rules can then be used with different search algorithms (where alternative search algorithms are available). However, in some cases rules may also be defined within a profile.

Profiles can allow operational and technical considerations to be effectively represented and applied. A user preferably selects a profile when initiating a search, and the search will then identify suitable circuits in accordance with the rules, constraints and search options specified in the profile. Different profiles may, for example, be used in a search depending on the type of service for which a circuit is required. More generally, different profiles may, for example, be provided to support different technologies, types of services or service levels (e.g. service quality levels), and different routing requirements for different customer classes or geographical areas.

The use of profiles and rules allows the search behaviour of the route finder application to be modified without requiring the route finder application itself to be changed.

Example Rules: Some specific examples of rules will now be given. In preferred embodiments, these may be provided as default rules with the route finder application. In addition to the default rules, the user may then define further rules based on specific requirements.

Physical-diversity rule: The purpose of the rule has already been described above. In this example, the rule counts the number of nodes common to two routes. The total number of common nodes then gives a diversity score for a route pair. The rule can be used either as a scoring rule (with more diverse route pairs having a lower score because they have fewer nodes in common) or as a filtering rule (in which case route pairs with a non-zero count are discarded).

Minimum-hop rule: This is a scoring rule that gives the number of topology or circuit hops in a topology or circuit route. When scoring a protected circuit route or a protected topology route the Minimum hop rule gives the combined number of hops for both the protected and protection routes.

Ports-available-for-air-gap rule: If air gaps are to be used to connect topologies, this rule ensures that. available start and end ports exist for the new circuit that will be created between the topologies. If this rule is not used, a topology solution can be found with air gaps but it may not be possible to create the circuit because no ports will have been identified for use.

Valid-path-start-port rule: For the algorithm to create a path there must usually be an available port, of the correct bandwidth, at both the start node and the end node. This rule checks that ports are available on the nodes the algorithm suggests as start or end nodes.

Unique-route rule: The unique-route rule eliminates those routes that have the same start point, end point and underlying route as another identified route.

Delete-duplicate-circuit-routes rule: Circuit routes are produced from topology routes. Since nodes can appear on more than one topology, it is possible that two different topology routes produce exactly the same circuit route (i.e. circuit routes having the same nodes and underlying circuits). This rule therefore removes the duplicate circuit routes from the list of solutions.

This rule may typically be used if a node exists in more than one topology in the network. If the rule is not used and duplicate circuit routes appear, this is not an error and does not cause any subsequent errors. It should be noted that a circuit route might be displayed simply as a list of nodes making up the route, and a seemingly duplicate list of nodes in the displayed circuits may have different underlying circuits; the users can therefore preferably display more information on the circuits to check this (for example by viewing timeslot mappings).

Timeslot rule (same bandwidth ID): The timeslot rule controls the circuit route based upon the capacity of the underlying network. For the algorithm to consider a circuit part of the route it must have at least one free timeslot of the same bandwidth ID as the overlying circuit.

Timeslot rule (same bandwidth order): Similar to the previous rule, except that the bandwidth of the underlying timeslot and the circuit being created must be of the same bandwidth order.

Timeslot rule (underlying circuit bandwidth order overlying circuit bandwidth order): Similar to the timeslot (same bandwidth ID) rule, except that the underlying timeslot may be larger than the circuit being created.

Timeslot rule (single or multiple underlying timeslots): This rule can be used to enable the circuit being created to run over either: a single underlying timeslot of the same bandwidth order as the circuit being created, or a number of timeslots that when aggregated are the same bandwidth as the circuit being created.

Timeslot rule (multiple underlying timeslots): This rule can be used to create a circuit to run over a number of timeslots that when aggregated are the same bandwidth as the circuit being created.

Contiguous-timeslots rule: This rule is similar to the timeslot rule (single or multiple underlying timeslots) described above, but the timeslots must be contiguous. This rule should usually only be used when contiguity of timeslots is mandatory, since it may have an adverse effect on the search performance.

No-SDH-topologies rule: This rule can be used to ensure that no SDH topologies are found in the route. For example, this rule could be used to define a PDH-only profile that ensures routes do not go over SDH parts of the network.

Ports-and-paths rule: This rule can be used to ensure that when paths are found in an underlying circuit route, the contiguity of paths and trails is maintained.

Protection-circuit-excluded rule: This rule can be used to eliminate solutions that use protection circuits. In some circumstances, protection circuits are preferably not used to route circuits and this rule could then be included in all profiles.

Set-dynamic-constraints rule: a rule setting the value(s) of dynamic constraints used by the Timeslot rules.

Delete-duplicate-topology-routes rule: This rule prevents routes visiting the same topology more than once.

Delete-duplicate-node-routes rule: This rule prevents routes visiting the same node more than once.

User Interface: In a preferred embodiment, the route finder application comprises a user interface in the form of a wizard. The term 'wizard' refers to an interactive computer program acting as an interface to lead a user through a complex task by way of a sequence of simple dialog steps.

Figure 8:
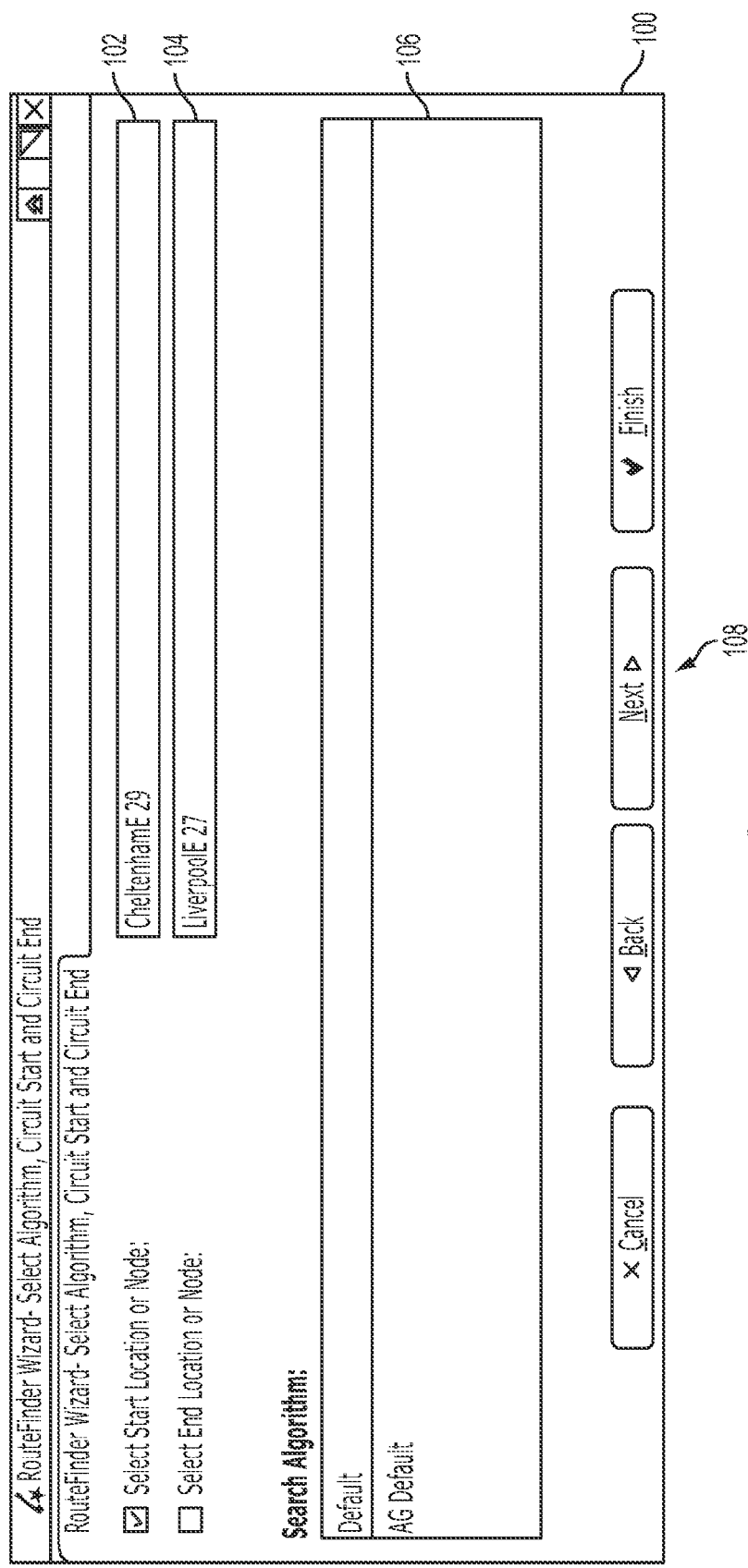
FIG. 8 illustrates an example of a user interface for use with the route finder application.

FIG. 8 shows, by way of example, a screenshot of the route finder wizard. The main window 100 of the wizard comprises entry boxes 102 and 104 for entering the start and end nodes of the circuit to be designed. A selection box 106 is provided to enable selection of the preferred search algorithm (where multiple search algorithms are available). A set of control buttons 108 are provided for stepping forwards and backwards through the wizard and for aborting or completing the wizard.

Further wizard pages may be provided for inputting other search parameters, including parameters required by search profiles or rules being applied to the search. These may specify a list of allowable values or inventory objects (such as nodes) depending on the type of parameter.

Figure 9:
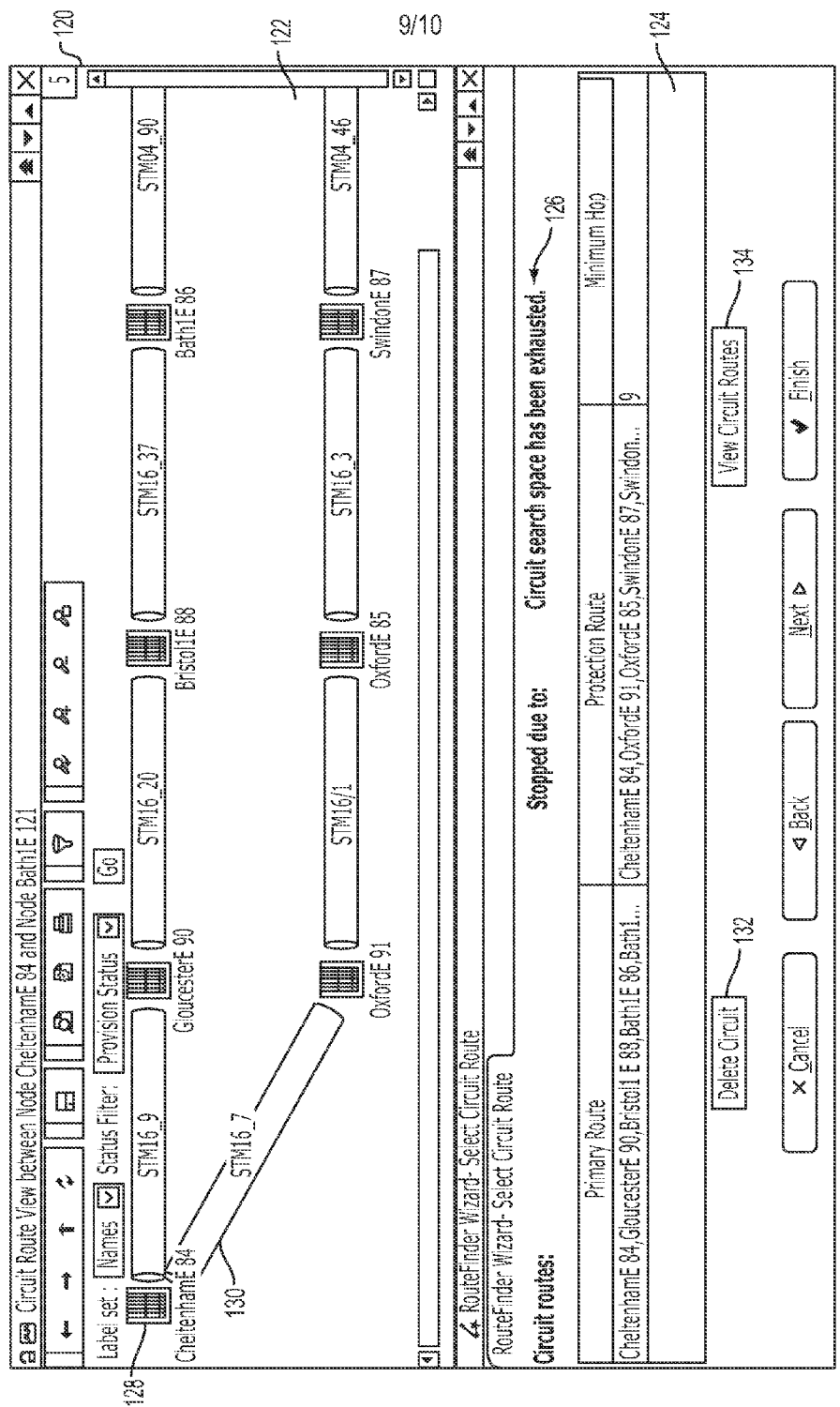
FIGS. 9 and 10 illustrate results screens presented by the route finder application.

FIG. 9 shows an example of a results screen generated by the wizard. The results screen includes a lower window 124 listing the search results, and an upper window 120 showing a route view 122 displaying a graphical representation of a selected route or pair of routes.

In the example of FIG. 9 the user has searched for a protected pair of routes as described above. Only a single pair has been found and is displayed in summary form in lower window 124. The summary form here is simply a list of the names of the network nodes through which the route passes. The route is graphically visualised in the upper window 120. The route view 122 includes icons 128 representing the route nodes, labelled with node names, and circuit connections represented graphically as pipes 130 labelled with the connection type. Different icons could be used to represent different types of node equipment. The interface also includes a "delete circuit" button 132 for removing a selected circuit from the results list, and a "view circuit routes" button 134 for causing the route view 122 to display the selected route or routes.

Figure 10:
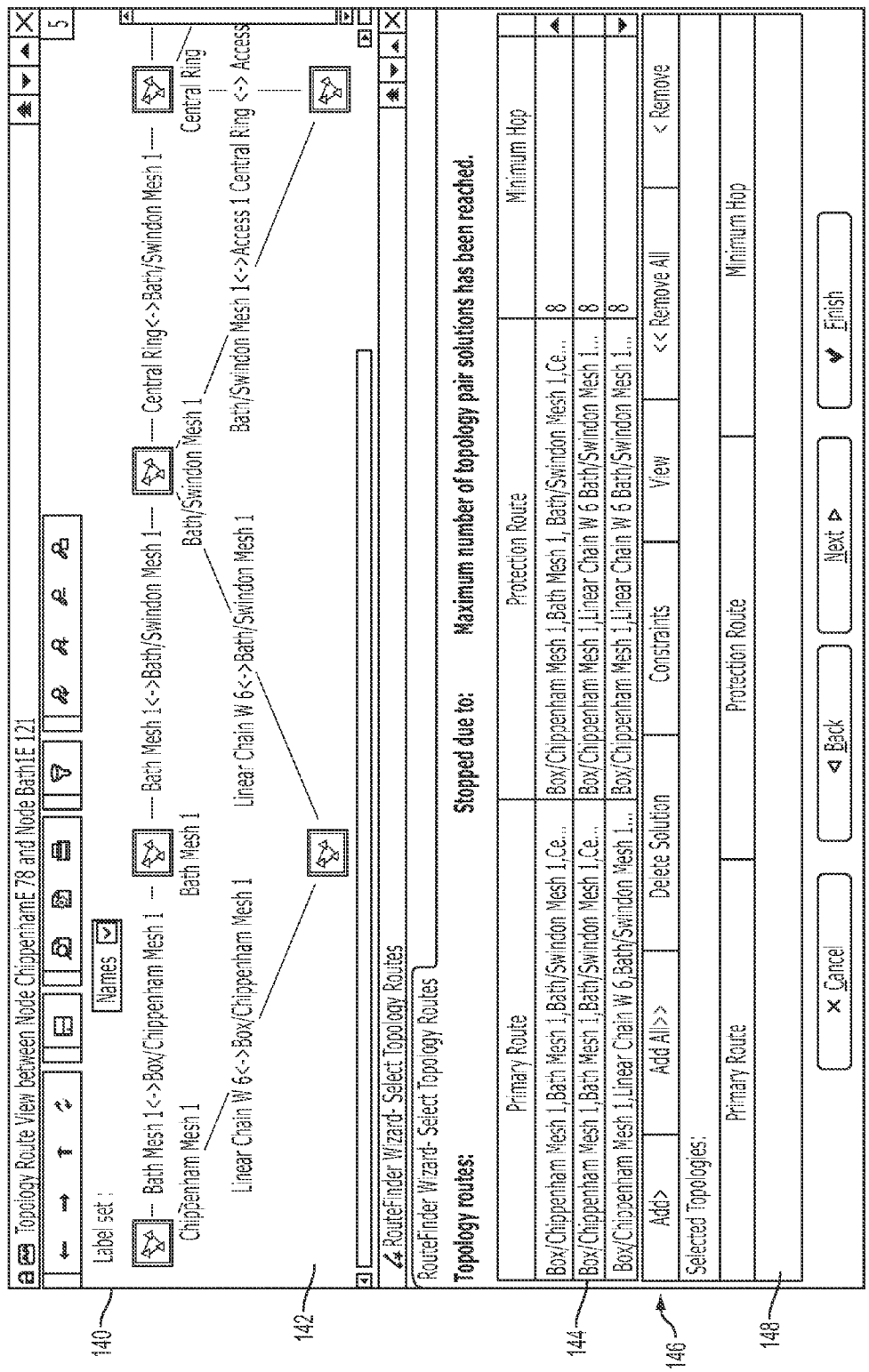

The results shown are final results of the route search (i.e. results from the circuit search stage). Intermediate results, in particular of the topology search stage, can be visualised similarly. Typically, different icons and link representations (e.g. simple lines) would be used to represent the nodes and interconnects of a topology-level route. An example of this is shown in FIG. 10. Here, an upper window 140 includes a topology route display 142 displaying a graphical representation of a selected pair of topology routes. A lower window includes a list 144 of topology routes found by the topology search, and a list 148 of topology routes selected as input for the node/circuit search stage of the process (currently empty). Buttons 146 are provided for deleting and displaying routes as before ("delete solution"/"view"), and also for adding routes to and removing routes from the selected route list 148 ("add"/"add all"/"remove"/"remove all"). A further button ("constraints") allows constraints on the topology search results to be viewed and changed.

Graphical visualisation of routes and circuits can improve the speed and accuracy of the circuit design process. Preferably, the route view allows multiple routes to be visualised at the same time. This can enable easier comparison of alternative solutions, especially where these differ only in a few places (say, only by three or four nodes in a twenty-hop route). The route view may either display only selected routes, or may display all routes found in the search. In the latter case, the currently selected route is preferably highlighted in the route view.

If protected pairs of paths have been found in the search, the main and protection routes are preferably visually distinguished, for example by using different colours.

The user interface may, for example, be hosted in a web browser, using Java applet technology and HTML, XML and SVG (Scalable Vector Graphics) for displaying data and graphical route views, to enable platform-independent access to the interface over the Internet. Alternatively, the user interface may be implemented as a standalone application.

The route finder wizard may provide a series of predefined integration points (both in terms of metadata configuration and code plug-ins) at which users may apply custom validation of user input as well as customisation of values, warnings and errors returned to the user by the wizard user interface. For example, a naming convention could be implemented by way of a plug-in which ensures that a name conforming to the convention is automatically generated for any new circuits created by the route finder application.

In addition to being driven through an interactive process (such as the wizard described above), the route finder application preferably also provides an API (application program interface) through which it can be used programmatically. The API may then be used, for example, by an automated provisioning process to design circuits for use in a telecommunications service being provisioned. Any information required by the search (such as route start and end locations and search constraints) would then be supplied by the invoking process.

Summary: The route finder application can provide a variety of features and benefits, including:

The route finder application can search transparently across multi-domain networks, where the network domains may be managed by the same or different vendor network management systems.

Rules and profiles can enable operational and technology constraints to be applied to a search.

Visualization tools can increase the speed and accuracy of a designer's decision and approval process The route finder application can support the design of routes over real or planned network in the inventory.

The route finder application can be configured to enable air gap routing, which can be difficult to achieve in systems where only the real or currently designed network is available for searching.

The route finder can enable main and protection routes to be found and visualized simultaneously, allowing for efficient design of protected circuits By providing appropriate route scoring and selection rules, the route finder application can operate automatically, without the need for user interaction.

The route finder application can enable the application of hard (mandatory) and soft (best efforts) operational and technical rules, leading to consistent network design that meets operational requirements, and freeing skilled staff to focus on more complex network design activities Automation can reduce human error, resulting in fewer rejected designs. Coupled with an accurate, maintained inventory, this can significantly cut the time required to deliver network services.

The route finder application can replace repetitive and time-consuming manual routing processes, providing the designer with the route required, or presenting and visualizing the choices available, where appropriate, thus speeding up the design process.

The route finder application can provide a sophisticated, scalable solution for end-to-end routing across a variety of structured bandwidth technologies such as SDH, SONET and PDH, as well as packet-oriented technologies such as Gigabit Ethernet and Resilient Packet Ring (RPR).

It will be understood that the present invention has been described above purely by way of example, and modification of detail can be made within the scope of the invention.

For example, in some embodiments, the topology search stage may be optional. The circuit search may be constrained in some other way, or the user may specify a topology route as input to the node/circuit search. In some embodiments, the user may select between multiple alternative search algorithms, or may specify a custom search algorithm.

What is claimed is:

1. A method of selecting a route for a telecommunications circuit comprising:
    storing a database comprising data representative of a network model, the data comprising:
        data representative of network nodes of the network;
        data representative of existing connections between nodes; and
        data representative of potential connections between nodes, the data specifying nodes which may be connected in the network but which are currently not connected; the method further comprising
    storing, in the database, first model data representing a first model of the network, the first model data defining network nodes and connections between network nodes in the network;
    receiving, by a computer, second model data representing a second model of the network, the second model data defining a plurality of node groups;
    searching, by the computer, the data representative of existing connections and the data representative of potential connections in the network model to determine a route through the network from a start node to an end node;
    identifying, by the computer, a plurality of routes between a start node group and an end node group, wherein each of the start node group and the end node group represent a plurality of network nodes of the first model of the network;
    selecting one of the plurality of identified routes;
    calculating a score for each of the plurality of identified routes;

outputting the identified routes in accordance with the calculated scores;
storing a plurality of scoring rules;
receiving information specifying one of the plurality of scoring rules; and
calculating the calculated scores using the specified scoring rule.

2. A method according to claim 1, wherein the route comprises a plurality of connections of which at least one is a potential connection.

3. A method according to claim 1, comprising generating implementation information for implementing a circuit in the network using the determined route.

4. A method according to claim 1, comprising, where the determined route includes a potential connection, outputting information indicating a requirement to provide an actual connection in place of the potential connection.

5. A method according to claim 1, comprising, where the determined route includes a potential connection between nodes, connecting the nodes in the network.

6. A method of selecting a route for a telecommunications circuit comprising:
- accessing a network model, the network model specifying network nodes, existing connections between network nodes, and potential connections between network nodes;
- searching the existing connections and potential connections in the network model to determine a route through the network from a start node to an end node;
- storing first model data representing a first model of the network, the first model data defining network nodes and connections between network nodes in the network;
- receiving, by a computer, second model data representing a second model of the network, the second model data defining a plurality of node groups;
- identifying, by the computer, a plurality of routes between a start node group and an end node group, wherein each of the start node group and the end node group represent a plurality of network nodes of the first model of the network;
- selecting, by the computer, one of the plurality of identified routes;
- calculating a score for each of the plurality of identified routes;
- outputting the identified routes in accordance with the calculated scores;
- storing a plurality of scoring rules;
- receiving information specifying one of the plurality of scoring rules; and
- calculating the calculated scores using the specified scoring rule.

7. A route selection system for selecting a route for a telecommunications circuit comprising:
- a database, stored on a non-transitory storage medium, comprising data representative of a network model, the data including:
  - data representative of network nodes of the network;
  - data representative of existing connections between nodes; and
  - data representative of potential connections between nodes, the data specifying nodes which may be connected in the network but which are currently not connected;
- the database further storing first model data representing a first model of the network, the first model data defining network nodes and connections between network nodes in the network;
- the system further comprising
- means for receiving second model data representing a second model of the network, the second model data defining a plurality of node groups;
- means for searching, utilizing a processor, the data representative of existing connections and the data representative of potential connections in the network model to determine a route through the network from a start node to an end node;
- means for identifying a plurality of routes between a start node group and an end node group, wherein each of the start node group and the end node group represent a plurality of network nodes of the first model of the network;
- means for selecting one of the plurality of identified routes;
- means for calculating a score for each of the plurality of identified routes;
- means for outputting the identified routes in accordance with the calculated scores;
- means for storing a plurality of scoring rules;
- means for receiving information specifying one of the plurality of scoring rules; and
- means for calculating the calculated scores using the specified scoring rules.

* * * * *